United States Patent Office 3,505,033
Patented Apr. 7, 1970

3,505,033
CLARIFICATION OF ACID DIGESTION LIQUORS CONTAINING TITANIUM SULFATE USING METHYL PECTATE
Alfons Brzeski, Opladen-Grossendriesch, and Ruediger Paul and Werner Schmedding, Leverkusen, Germany, assignors to Titangesellschaft m.b.H., Leverkusen, Germany, a corporation of Germany
No Drawing. Filed Dec. 12, 1966, Ser. No. 600,714
Claims priority, application Germany, Dec. 15, 1965,
T 30,030
Int. Cl. B01d 21/01
U.S. Cl. 23—312                                                 5 Claims

ABSTRACT OF THE DISCLOSURE

The following disclosure describes and illustrates the addition of pectin to iron sulfate-titanium sulfate solutions obtained by digesting titanium ores and slags in concentrated sulfuric acid, for clarifying said solutions.

---

In the manufacture of titanium dioxide pigments from titaniferous ores and slags it is necessary to free the liquor obtained from the digestion of ores and slags with sulfuric acid prior to the subsequent hydrolysis from the finely dispersed particles, suspended therein, of undissolved constituents of the starting material. Owing to the fine, often even colloidal distribution of these solid substances, it is not possible to separate them by filtration or by centrifuging in a reasonable time or at acceptable expense. Simple standing for the purpose of clarification does not achieve the desired result either. Rather, it is necessary to add auxiliary substances to the solution that are precipitated under the prevailing conditions or else coagulate and take the finely divided solid fractions along or flocculate them. For this purpose, according to prior art, either inorganic substances such a sulfur or the various metal sulfides which form a coarsely flocculated precipitate in acid solution may serve. Or else, organic compounds, especially colloids, are added to the liquor, which coagulate themselves in acid solution or produce coagulation of the substances to be flocculated.

The suggestion has been made previously to use glue, gelatin, albumin, protein of animal or vegetable origin for this purpose (U.S. Patents 2,133,251 and 2,111,788; British Patents 473,054 and 228,814). These substances, however, have the disadvantage that the desired effect is incomplete. In addition, they disturb the further processing of the liquor so that their excess must be removed by the addition of polyhydroxy benzoic acid derivatives such as tannic acid (British Patent 473,054 and U.S. Patent 2,133,251). In case casein is used as flocculation agent the impurities flocculated out contain fairly large amounts of metatitanic acid (M. Grimberg, Farbe und Lack 70 (1964) No. 3, p. 198) which, naturally, is not desired either.

It is also known that the filterability of acid liquors or ores containing uranium and thorium can be improved by flocculation of the very small solid particles in the liquors with water-soluble cellulose ether (Austrian Patent 236,918). Good results are, however, obtained only if the cellulose ethers are employed together with other flocculating agents such as vegetable gum, animal glue or polyacrylamide, the addition of which produces the disadvantage outlined above.

Difficulties, owing to the strong frothing in handling and removing of the clarification sludge, are encountered in the numerous processes known in practice of obtaining clarification with surface-active materials, for example, with sulfonates (B.I.O.S. Final Report No. 451, p. 7; Lakokrasocnye materially i ich primenenie (1962) No. 3, pp. 45–47 and (1965) No. 4, pp. 27–28).

An object of the instant invention therefore is to provide a process for removing the undissolved solid matter from a digestion solution which overcomes the disadvantages listed above. A further object is to provide a clarification process which is economical to employ and still capable of removing in an efficient manner the undissolved suspended solids from a sulfuric acid digestion of a titaniferous ore or slag. These and other objects will become more apparent from the following and more complete description of the instant invention.

Broadly the instant invention contemplates a process for the clarification of a sulfuric acid digestion solution prepared from the digestion of a titaniferous iron ore or slag, said solution containing undissolved suspended solids, which comprises adding to said digestion solution from 6 to 60 mg. of pectin and preferably from 12 to 20 mg. pectin per liter of digestion solution.

These amounts of pectin should be dissolved in water and the aqueous solution should be added to the digestion solution in amount from 1% to 4% by volume, i.e. from 10 to 40 ml. per liter of digestion solution.

The clarification, according to the invention, is distinguished particularly by the fact that the amounts of pectin to be added are relatively slight. Thus, the content of extraneous substances in the liquor containing titanium, which could have a disturbing effect on the further course of processing is kept low from the start. Thus the amounts specified above are sufficient to effect flocculation of the finely divided undissolved constituents which then settle out rapidly and may be separated as sludge.

The amount of pectin remaining in the digestion liquor after clarification is so slight that it does not produce any disturbance in the further working up of the clarified digestion liquor and the subsequent processing steps of pigment manufacture. It is, therefore, not necessary to remove it in a separate processing step. Furthermore, only very slight amounts of titanium dioxide are precipitated in the clarification, according to the invention, together with the substances to be removed.

A clarifying effect is shown especially by pectins having a relatively high molecular weight, for example, apple pectins, that is, the highly esterified ones, i.e., those in which over 50% of the esterifiable groups are esterified with methanol, as well as the low esterified ones with an esterification degree of below 50%. The latter are suitable for clarification of digestion liquors obtained from ilmenite and slags; the former, however, for slag digestion liquors only. Particularly advantageous is a pectin which is esterified at 32%. This pectin, which is subsequently designated as pectin 32, has not only the highest clarifying power in comparison with pectins which are, for example, esterified at 78%, 37% or 24%—also, lower additions are needed for producing optimum clarifying effect.

In the pectins having an esterification degree of less than 50% it is necessary for a successful clarification to prepare the pectin solution with water free of formers of hardness and other soluble salts, and preferably warm. For this purpose, besides fully deionized water, condensed water that shows a hardness of less than 0.1° dH and which gives practically no cloudiness with silver nitrate is suitable.

Clarification is carried out generally in such a way that ca. 1 to 4 vol. percent of an aqueous pectin solution (on the basis of the volume of the digestion liquor) and containing from 6 to 60 mg. pectin preferably from 12 to 20 mg. pectin per liter of digestion solution are uniformly added and that the mixture is permitted to stand for 4 hours. After this period, the clarified solution is syphoned off.

The following examples serve for explanation of the process according to the invention.

EXAMPLE 1

500 ml. of a thoroughly stirred liquor at 60° C. which had been produced by digesting ilmenite with sulfuric acid and whose specific gravity was 1.500 were filled to the upper mark of a 500 ml. shaking cylinder of 30 cm. height. While swinging it, 10 ml. of an aqueous pectin solution containing .08% pectin (i.e. 8 mg.) were added immediately afterward. The cylinder was then closed with a ground-in stopper, turned upside down three times and left for 4 hours in a water bath at 55–60° C. At the end of this period the clarification was completed; the clear supernatant solution was drawn off and could be processed further without any difficulty.

For evaluation of the clarification effect, the content of solid particles not settled at a definite height of the clarified solution was determined. For this purpose 50 ml. liquor were pipetted from the measuring cylinder at a depth of 15 cm. (about at the level of the 250 ml. mark of the cylinder), diluted with 50 ml. of 2% sulfuric acid and sucked off on two superimposed 11 cm. "White band" filters. Then the residue was first washed with 2% sulfuric acid and then with water. The filters were subsequently reduced to ashes and the residue was weighed. In the solution clarified according to Example 1 a residue of 0.08 g.p.l. was found in this manner.

When 500 ml. of the same ilmenite digestion liquor was treated with 10 ml. of an aqueous solution containing .06% pectin instead of 0.08% pectin and processed as described above, again a residue of 0.08 g.p.l. was obtained.

When repeating Example 1 under the same conditions but without the addition of clarifying agent, a residue of 1.8 g.p.l. was found.

EXAMPLE 2

To 500 ml. of the ilmenite digestion liquor of Example 1 were added 10 ml. of an 0.08% pectin (24% esterified) solution. Further processing was as described in Example 1. The residue found amounted to 0.30 g.p.l.

EXAMPLE 3

500 ml. of a warm (60° C.) slag digestion liquor having a specific gravity of 1.540 were treated as in Example 1, with 10 ml. of a 0.06% pectin (32% esterified) solution and processed further, as described above. The determination of the residue gave a value of 0.09 g.p.l. Without the addition of clarifying agent a residue of 15.3 g.p.l. was obtained using the same procedure.

EXAMPLE 4

To 500 ml. of the slag digestion liquor of Example 3, 10 ml. of a 0.10% pectin (78% esterified) solution were added. Subsequent processing was carried out as in Example 1, A residue of 0.28 g.p.l. was found.

While this invention has been described and illustrated by the examples shown, it is not intended to be strictly limited thereto, and other variations and modifications may be employed within the scope of the following claims.

What is claimed is:

1. Process for clarification of a sulfuric acid digestion solution prepared from the digestion of a titaniferous iron ore or slag, said solution containing solubilized sulfates of iron and titanium and undissolved suspended solids, which comprises adding to said digestion solution an amount of an aqueous pectin solution sufficient to provide from 6 to 60 mg. of pectin per liter of digestion solution said pectin having from 24% to 78% of the esterifiable groups esterified with methanol.

2. Process for clarification of a sulfuric acid digestion solution according to claim 1 wherein said pectin is added in an amount from 12 to 20 mg. per liter of digestion solution.

3. Process according to claim 1 in which said pectin is dissolved in water to form an aqueous pectin solution, said water being substantially free of hardness formers and similar soluble salts, said pectin solution being added in amount from 1% to 4% by volume, i.e. from 10 to 40 ml. per liter of digestion solution.

4. Process according to claim 1 in which the pectin is one wherein about 32% of the esterifiable groups are esterified with methanol.

5. Process according to claim 1 in which the digestion solution has a temperature of 50° C. to 70° C. when said pectin is added.

References Cited

UNITED STATES PATENTS

| | | | |
|---|---|---|---|
| 2,133,251 | 10/1938 | McCord | 210—54 X |
| 2,280,590 | 4/1942 | Krchma | 23—117 |
| 2,287,861 | 6/1942 | Roche | 210—54 X |
| 2,416,216 | 2/1947 | Rau | 23—117 |
| 2,419,930 | 4/1947 | Wilson | 210—54 X |
| 3,082,173 | 3/1963 | Horwitz | 210—54 X |
| 3,085,853 | 4/1963 | Lesinski | 210—54 X |
| 3,235,490 | 2/1966 | Goren | 210—54 X |
| 3,235,491 | 2/1966 | Rosenberg | 210—54 X |
| 3,338,828 | 8/1967 | Clark | 210—54 X |

NORMAN YUDKOFF, Primary Examiner

S. T. EMERY, Assistant Examiner

U.S. Cl. X.R.

23—117, 126; 75—115; 210—54; 260—209.5